(12) United States Patent
Batchelor

(10) Patent No.: US 6,609,370 B2
(45) Date of Patent: Aug. 26, 2003

(54) DUAL HYDRAULIC BOOSTER ASSEMBLIES FOR VEHICLE HYDRAULIC BRAKING SYSTEMS

(75) Inventor: Mark Batchelor, Newport (GB)

(73) Assignee: ArvinMeritor, Inc., Troy, MI (US)

( * ) Notice: Subject to any disclaimer, the term of this patent is extended or adjusted under 35 U.S.C. 154(b) by 95 days.

(21) Appl. No.: 09/754,150

(22) Filed: Jan. 4, 2001

(65) Prior Publication Data

US 2001/0006307 A1 Jul. 5, 2001

(30) Foreign Application Priority Data

Jan. 5, 2000 (GB) .............................. 0000051
Jun. 17, 2000 (GB) .............................. 0014753

(51) Int. Cl.$^7$ ............................................. B60T 13/00

(52) U.S. Cl. ..................... 60/547.2; 60/581; 188/354; 303/9.61

(58) Field of Search ................ 60/547.1, 547.2, 60/581, 593; 188/354; 303/9.61

(56) References Cited

U.S. PATENT DOCUMENTS

| | | | | |
|---|---|---|---|---|
| 3,120,244 A | * | 2/1964 | Hahn | 60/561 |
| 3,421,320 A | * | 1/1969 | Kershner | 60/581 |
| 3,640,067 A | * | 2/1972 | Ingram | 60/581 |
| 3,768,608 A | * | 10/1973 | Fulmer | 60/547.3 |
| 4,505,519 A | * | 3/1985 | Muterel | 303/9.61 |
| 4,516,400 A | * | 5/1985 | Tarplee | 60/581 |
| 4,557,110 A | | 12/1985 | Price | |
| 4,702,330 A | | 10/1987 | Vatter et al. | |
| 5,190,356 A | * | 3/1993 | Knowles | 303/9.61 |

\* cited by examiner

Primary Examiner—F. Daniel Lopez
(74) Attorney, Agent, or Firm—Carlson, Gaskey & Olds

(57) ABSTRACT

A dual hydraulic booster assembly for a braking system of a tractor or like vehicle has a logic valve operable in a first mode to control the supply of pressure fluid for braking on one side of the vehicle to facilitate steering, and in a second mode of operation to control the supply of fluid pressure for braking on both sides of the vehicle for full vehicle retardation. A pressure amplifier valve may be provided to increase the pressure of the pressure fluid from the logic valve for braking in the second mode of operation. The logic valve and amplifier valve may be incorporated into the booster assembly to provide an integrated unit.

15 Claims, 6 Drawing Sheets

DUAL HYDRAULIC BOOSTER ASSEMBLIES FOR VEHICLE HYDRAULIC BRAKING SYSTEMS

BACKGROUND OF THE INVENTION

This invention relates to dual hydraulic booster assemblies for vehicle hydraulic braking systems of the kind comprising a pair of pedal-operated hydraulic boosters which are adapted to be operated simultaneously for applying brakes on wheels on opposite sides of a vehicle for vehicle retardation and independently for applying a brake on a wheel on one side of the vehicle to facilitate steering.

Dual hydraulic booster assemblies have application to braking systems for vehicles where it is desirable to achieve braking on front and rear wheels for normal service braking but to restrict braking to one rear wheel on one side only of the vehicle for steering purposes and in particular, but not exclusively, agricultural vehicles such as tractors which may tow trailers.

SUMMARY OF THE INVENTION

It is an object of the present invention to provide a dual hydraulic booster assembly which can be used for such application.

It is a preferred object of the present invention to provide a dual hydraulic booster assembly in which the fluid pressure obtained when both boosters are operated simultaneously is increased for braking on both sides of the vehicle.

According to one aspect of the present invention there is provided a dual hydraulic booster assembly for a vehicle braking system incorporating a logic valve responsive to booster pressures to control the supply of pressure fluid for braking on one side of a vehicle when one booster is operated on its own in a first mode of operation, and for braking on both sides of a vehicle when both boosters are operated simultaneously in a second mode of operation.

By this invention, the logic valve controls the supply of pressure fluid so that, in the first mode of operation, when one booster is operated, the supply of pressure fluid causes braking of one rear wheel on one side of the vehicle associated with that booster to facilitate steering and, in the second mode of operation, when both boosters are operated simultaneously, the supply of pressure fluid causes braking of the wheels on both sides of the vehicle for normal service braking.

More particularly, the logic valve controls the supply of fluid pressure in the second mode of operation when both boosters are operated to cause braking of the front wheels of the vehicle and a trailer (where provided) with the boosters causing braking of the rear wheels of the vehicle. In this way, all wheels are braked in the second mode of operation. By contrast, the logic valve isolates the supply of fluid pressure from the brakes for the front wheels and trailer (where provided) in the first mode of operation when only one booster is operated so that only the rear wheel associated with that booster is braked.

The dual hydraulic booster assembly of the present invention has the advantage that the logic valve is common to both boosters in an integrated unit that avoids the requirement for auxiliary logic heads and valves separate from the booster assembly. As a result, the number of parts and associated pipework and fittings are reduced to a minimum thereby facilitating installation and simplifying repair/maintenance.

Preferably, each booster comprises a boost piston working in a bore in a body adapted to generate an output force for operating a hydraulic master cylinder coupled to the rear brakes on one side of the vehicle in response to pressure in a boost chamber which is applied to a proportional power pressure chamber under the control of a control valve, in turn responsive to an input force from the pedal.

Advantageously, each booster and associated master cylinder are combined and both booster and master cylinder assemblies are integrated in a common housing with the outputs from the master cylinders arranged to operate the rear brakes on opposite sides of the vehicle. For example, each master cylinder may operate one rear brake such that a braking force may be applied to the rear wheel on that respective side only to facilitate steering.

In one construction the logic valve comprises inner and outer pressure-responsive telescopic pistons working in a bore in the body and responsive to pressure applied to the outer ends by the associated booster to control the supply of pressure fluid in the first and second modes of operation.

Preferably, the pistons are held in a passive condition of the logic valve by a first spring acting between the pistons, and by a second spring acting on the outer piston only with respective pre-loads of the springs being chosen to withstand the collective threshold forces of seals on each piston to ensure full return of each piston to the passive condition upon release of the pressure applied to the outer end.

Advantageously, when both boosters are actuated simultaneously in the second mode of operation, displacement of both pistons relative to each other allows flow through passages leading from the boosters to a pressure chamber defined between the pistons to activate a braking system for the front wheels on both sides of the vehicle and trailer brakes (where provided), with the passages being isolated from the pressure chamber in both the passive condition and when either booster is operated on its own in the first mode of operation.

More particularly, relative displacement of the pistons provides flow paths through the pressure chamber for the supply of pressure fluid to a common outlet port in the second mode of operation to activate the braking system for the front wheels and trailer brakes (where provided), and to isolate the outlet port in the first mode of operation.

In this way, the front brakes/trailer brakes are only applied when both boosters are actuated and, when either booster is operated on its own, the front brakes/trailer brakes are isolated so as to apply only the respective rear brake coupled to that booster.

Preferably, the logic valve is also provided with oppositely acting one-way return valves which are normally open in the passive condition and are closed to prevent fluid flowing from the pressure chamber back to the boosters when the pressure chamber is pressurised and which open again to return fluid to a reservoir upon release of the boost pressure at the end of the braking cycle.

Advantageously, the pistons are displaced by the full boost pressure from the associated booster which acts to close the one-way valves and, when both boosters are operated together, the pressure chamber is connected to the proportional pressure in the proportional power pressure chambers of both boosters which never exceeds the full boost pressure to ensure the one-way valves remain closed.

At the knee-point of the booster assembly, when the proportional pressure equals the full boost pressure, the logic valve is held in equilibrium and the springs urge the pistons into the passive position, but with full boost pressure applied through the pressure chamber.

The performance of the dual hydraulic booster assembly with logic valve is satisfactory for most applications but there can be situations for normal service braking when the front and rear braking requirement is such that a higher fluid pressure is required than the pressure conventionally available on the vehicle.

Accordingly, in a preferred arrangement, when both boosters are operated simultaneously, the pressure of the pressure fluid is increased by the provision of a pressure amplifier valve to enable higher fluid pressures to be obtained for the braking requirements under normal service braking.

The pressure amplifier valve may be provided separate from the booster assembly so as to receive the pressure fluid from the booster assembly via the logic valve in the second mode of operation. This adds to the overall cost of the braking system, in particular, the installation and maintenance costs for providing a separate pressure amplifier valve.

More preferably, however, the pressure amplifier valve is incorporated into the booster assembly to produce a single integrated unit. In this way, installation and maintenance is simplified compared to the provision of a separate pressure amplifier valve with resulting potential cost savings.

More particularly, the number of separate parts and components is reduced by integrating the amplifier valve into a combined dual hydraulic booster assembly with logic valve.

By this combination of the pressure amplifier valve with the logic valve, the logic valve controls the supply of fluid pressure to provide separate, independent braking on each side when only one booster is operated to facilitate steering, and simultaneous, combined braking on both sides when both boosters are operated together for full vehicle retardation during normal service braking, with the pressure amplifier valve being operable to ensure the required fluid pressure is obtained when both boosters are operated simultaneously.

More particularly, the dual hydraulic booster assembly operates via the logic valve either to connect the pressure amplifier valve to actuate the front brakes of the wheels on both sides of the vehicle and, where provided, the trailer brakes, while conventionally boosting the master cylinder pressure to actuate the rear brakes on both sides of the vehicle for normal service braking when both boosters are operated simultaneously, or to isolate the pressure amplifier valve to actuate the rear brakes on one side of the vehicle only for steering when only one of the boosters is operated.

Preferably, the amplifier valve comprises a piston working in a stepped bore to define chambers of different area for increasing the proportional pressure from the logic valve in a ratio according to the quotient of the areas.

Advantageously, the piston is responsive to the proportional pressure from the logic valve to displace the piston against a return force and pressurise fluid in an outlet chamber connected to the braking system for the front brakes/trailer brakes.

Preferably, the outlet chamber is connected to the reservoir in the retracted position to relieve the pressure in the outlet chamber when the brakes are released.

According to another aspect of the present invention, there is provided a dual hydraulic booster assembly for vehicle hydraulic braking systems comprising a pair of pedal-operated hydraulic boosters adapted to be operated independently for applying a brake on a wheel on one side of the vehicle to facilitate steering in a first mode of operation and simultaneously for applying brakes on wheels on opposite sides of a vehicle for vehicle retardation in a second mode of operation, and a pressure amplifier valve for increasing the fluid pressure obtained in the second mode of operation when both boosters are operated simultaneously.

Preferably, a logic valve responsive to booster pressures is operable to isolate the pressure amplifier valve from the boosters when one booster is operated on its own in the first mode of operation, and to place the pressure amplifier valve in fluid communication with the boosters when both boosters are operated simultaneously in the second mode of operation.

Advantageously, the pressure amplifier valve and logic valve are incorporated with the boosters in an integrated unit in which the logic valve places the pressure amplifier valve in fluid communication with pressure fluid from both boosters in the second mode of operation.

According to yet another aspect of the present invention, there is provided a dual hydraulic booster assembly incorporating a logic valve and a pressure amplifier valve, the logic valve being responsive to booster pressures to isolate the pressure amplifier valve from both boosters when one booster is operated on its own in a first mode of operation, and to place the pressure amplifier valve in fluid communication with both boosters when both boosters are operated simultaneously in a second mode of operation.

Preferably, the boosters provide independent braking for the rear wheels on opposite sides of the vehicle in the first mode of operation, and simultaneous braking for the front wheels on both sides of the vehicle and for the wheels of a trailer where provided in the second mode of operation.

With this arrangement, the fluid pressure from each booster provides braking on one side of the vehicle for steering in the first mode of operation with the pressure amplifier valve isolated, and the fluid pressure from both boosters is increased by the pressure amplifier for braking on both sides of the vehicle in the second mode of operation.

The invention will now be described in more detail, by way of example only with reference to the accompanying drawings.

DETAILED DESCRIPTION OF THE EXEMPLARY EMBODIMENTS

Referring first to FIGS. 1 to 4 of the accompanying drawings, a first embodiment of a dual combined booster and master cylinder assembly embodying the invention is depicted. The assembly comprises first and second combined booster and master cylinder assemblies in first and second longitudinal bores 1 and 2 respectively of a common housing 3.

Each first and second assembly is similar and comprises a booster 4 and a master cylinder 5. Since the two assemblies are similar in construction only one will be described in detail.

Figure 1:
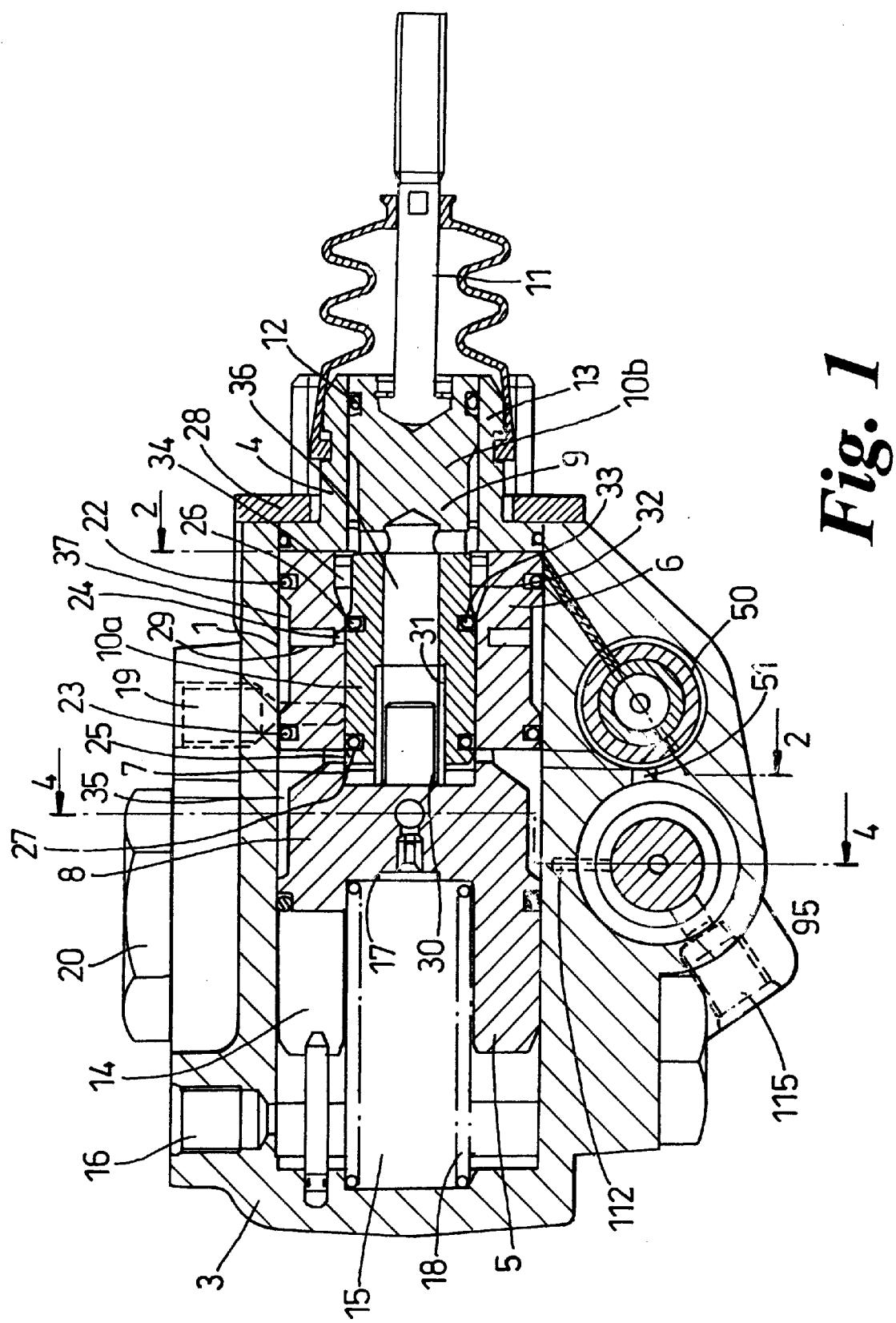
FIG. 1 is a longitudinal section through a first embodiment of a dual combined hydraulic booster and master cylinder assembly embodying the invention on the line 1—1 of FIG. 2.
Figure 2:
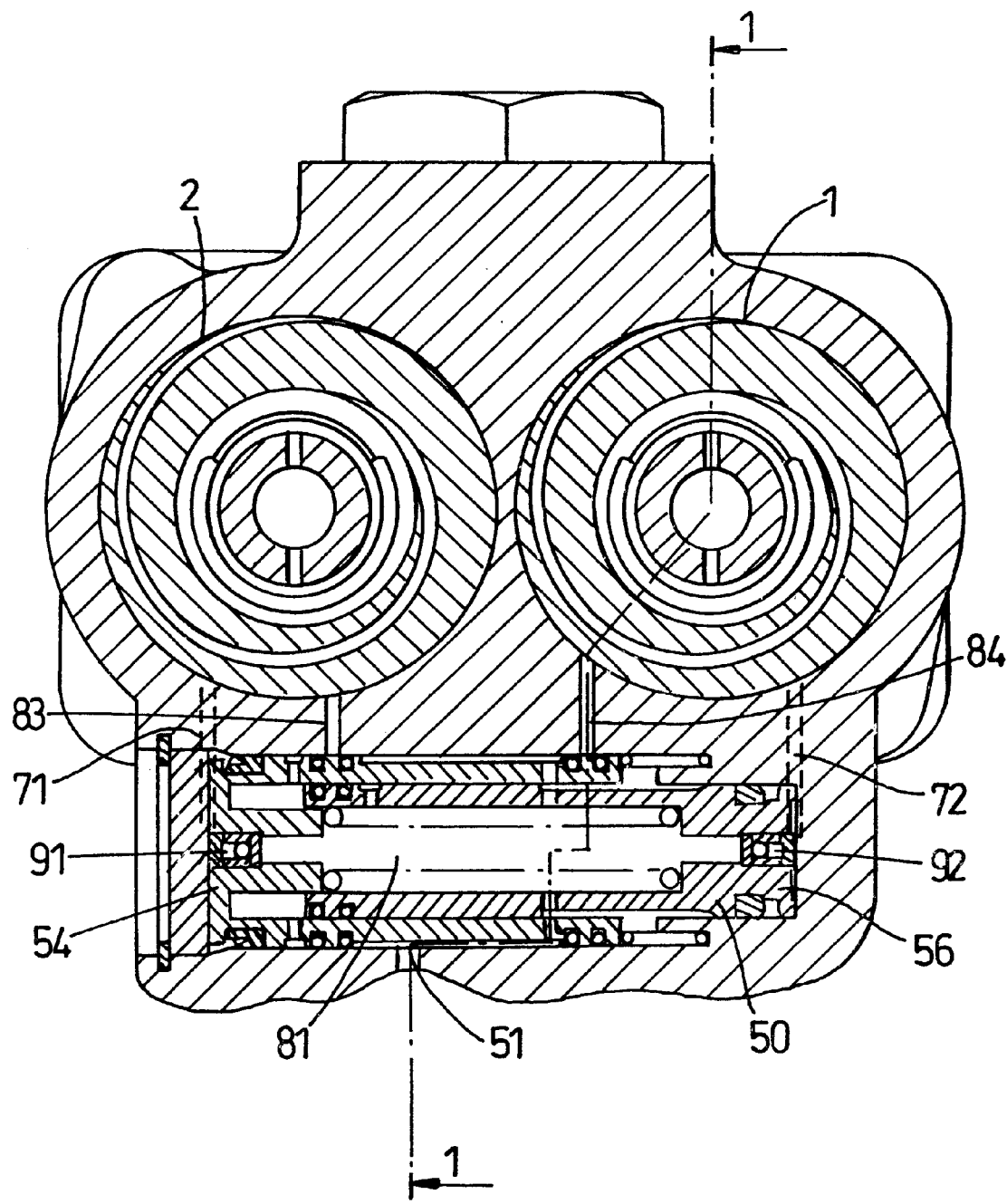
FIG. 2 is a section through the assembly substantially on the line 2—2 of FIG. 1.

As best shown in FIG. 1, the booster 4 has a boost piston 6 working in the bore 1,2. The boost piston 6 has a longitudinally extending internal bore 7 which is closed at its inner end by an end wall 8. A control valve 9 is housed in the bore 7.

The control valve 9 comprises a spool 10a working in the bore 7 and a plunger 10b slidably guided in a closure 13 for the outer end of the bore 7. The plunger 10b is provided with a seal 12 at the outer end and is connected to a rod portion 11 which co-operates with an input member, suitably a pedal operated rod.

The master cylinder 5 comprises a piston defined by a forward extension 14 of the boost piston 6 adapted to pressurise fluid in a pressure chamber 15 connected to a brake on a rear wheel on one side of the vehicle through an outlet 16 in the housing 3. In an alternative arrangement, the boost piston 6 and master cylinder piston 14 may be separate.

In a rest or inoperative condition, the pressure chamber 15 is connected to a reservoir via a hole (not shown) through a reservoir port 20 and a normally open recuperation valve 17 in the piston 14.

In the rest condition, the piston 14 of the master cylinder and the boost piston 6 are normally held in a retracted position by means of a return spring 18 acting between an end wall of the bore 1,2 and the end wall 8 of boost piston 6.

The housing 3 is provided with an inlet 19 spaced axially from the outlet 16 and connected to a supply of high pressure fluid, suitably a pump or hydraulic accumulator. The inlet 19 is disposed between axially spaced radial seals 22 and 23 carried by the boost piston 6 and communicates with a boost chamber 37.

Radial inlet ports 24 and radial outlet ports 25 are both provided in the wall of the boost piston 6 with each port being controlled by a respective one of a pair of axially spaced radial seals 26 and 27 carried by the spool 10a. The inlet ports 24 communicate with the boost chamber 37 through radial passages 29, and the outlet ports 25 communicate with a low pressure chamber 35 connected to the reservoir.

Each of the seals 22, 23, 26 and 27 comprises a combination of a PTFEF seal 32 backed by an elastomer seal 33. Each combination seal provides an effective sealing system able to compensate for any tolerance variations due to lack of concentricity between each bore 1,2 and the boost piston 6, and the bore 7 and the spool 10a.

A longitudinal passage 28 extends from the inner end of the spool 10a and communicates with a proportional pressure chamber 34 via radial ports 36 in the spool 10a. In the rest condition, the spool 10a is normally held in a retracted position by means of a return spring 30 housed in an enlarged portion 31 at the inner open end of the longitudinal passage 28.

In the retracted position, the passage 28 communicates with the reservoir via outlet ports 25 and the low pressure chamber 35, and the proportional pressure chamber 34 is isolated from the boost chamber 37 by the seals 26, 27, 22 and 23.

A logic valve 50 incorporated in the housing 3 is connected to the bores 1,2 of both boosters 4 and controls communication from the proportional pressure chamber 34 of each assembly to a pressure amplifier valve 95 via an outlet port 51.

Figure 3:
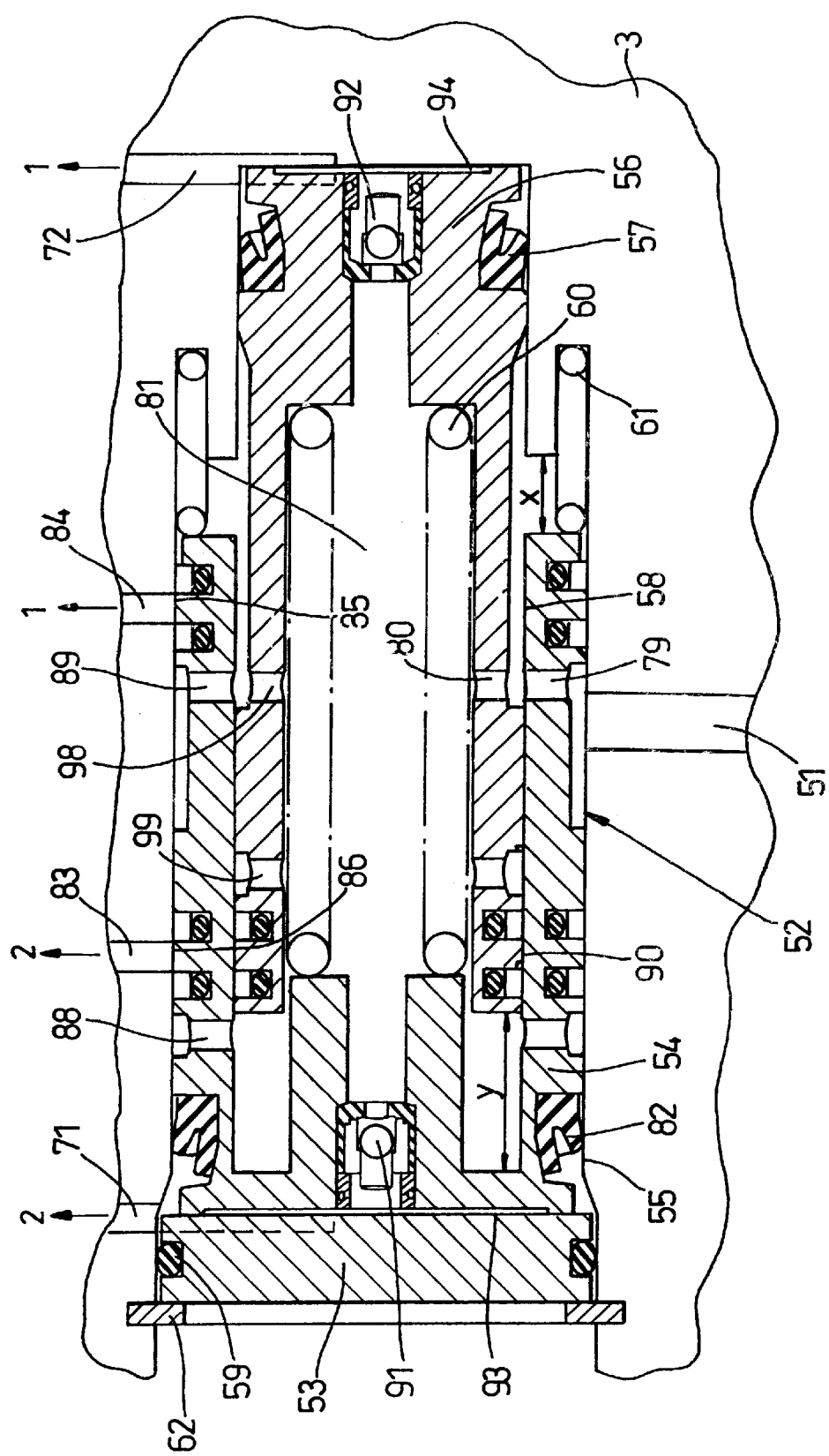
FIG. 3 is a longitudinal section on an enlarged scale of the logic valve incorporated in the assembly of FIGS. 1 and 2.

As best shown in FIG. 3, the logic valve 50 comprises a blind transverse bore 52 of stepped diameter in the housing 3 and which is closed at its outer end of greater diameter by means of an end closure 53 sealed by a static seal 59.

A pair of telescopic outer and inner pistons 54 and 56 respectively work in the bore 52 and are sealed at opposite ends of the bore 52 by a pair of lip seals 82. The outer piston 54 of greater diameter works in an equivalent outer bore portion 55. The inner piston 56 of smaller diameter works in an equivalent inner bore portion 57 of the bore 52 and an internal bore 58 of the outer piston 54.

The two pistons 54, 56 are normally held in a rest or passive position in abutment with stop faces at the opposite ends of the bore 52 by means of a first pre-loaded spring 60 which acts between the two pistons 54, 56 and a second preloaded spring 61 which acts between the inner end of the outer piston 54 and an abutment face in the housing 3. The piston sub assembly so constructed is retained in the bore 52 by a circlip 62 which retains the end closure 53 in position.

A pressure chamber 81 is defined in the bore 52 between the two pistons 54, 56 and is connected to the outlet port 51 through a radial port 79 in the wall of the piston 54 and an equivalent radial port 80 in the wall of the piston 56.

A passage 84 leading to the bore 1 of one assembly is normally isolated from the pressure chamber 81 by a land 85 disposed between a pair of spaced seals on the piston 54. Similarly, a passage 83 leading to the bore 2 of the other assembly is normally isolated from the pressure chamber 81 by a land 86 disposed between another pair of spaced seals on the piston 54.

A radial port 88 is provided in the piston 54 between the lip seal 82 and the land 86. A further radial port 89 is provided in the piston 54 between the lands 85, 86.

An external land 90 is provided at the free end of the inner piston 56 between a pair of spaced seals on the piston 56. The land 90 is normally spaced from the port 88 in the piston 54. Spaced radial ports 98, 99 are provided in the piston 56.

The pressure chamber 81 is normally in open communication with chambers 93, 94 at opposite ends of the bore 52 through oppositely acting, normally open, one way valves 91 and 92 respectively housed in recesses in the opposite outer ends of the two pistons 54, 56.

The chamber 93 is normally connected to the reservoir via low pressure chamber 35 in bore 2 by a boost pressure passage 71, and the chamber 94 is normally connected to the reservoir via low pressure chamber 35 in the bore 1 by a boost pressure passage 72.

Figure 4:
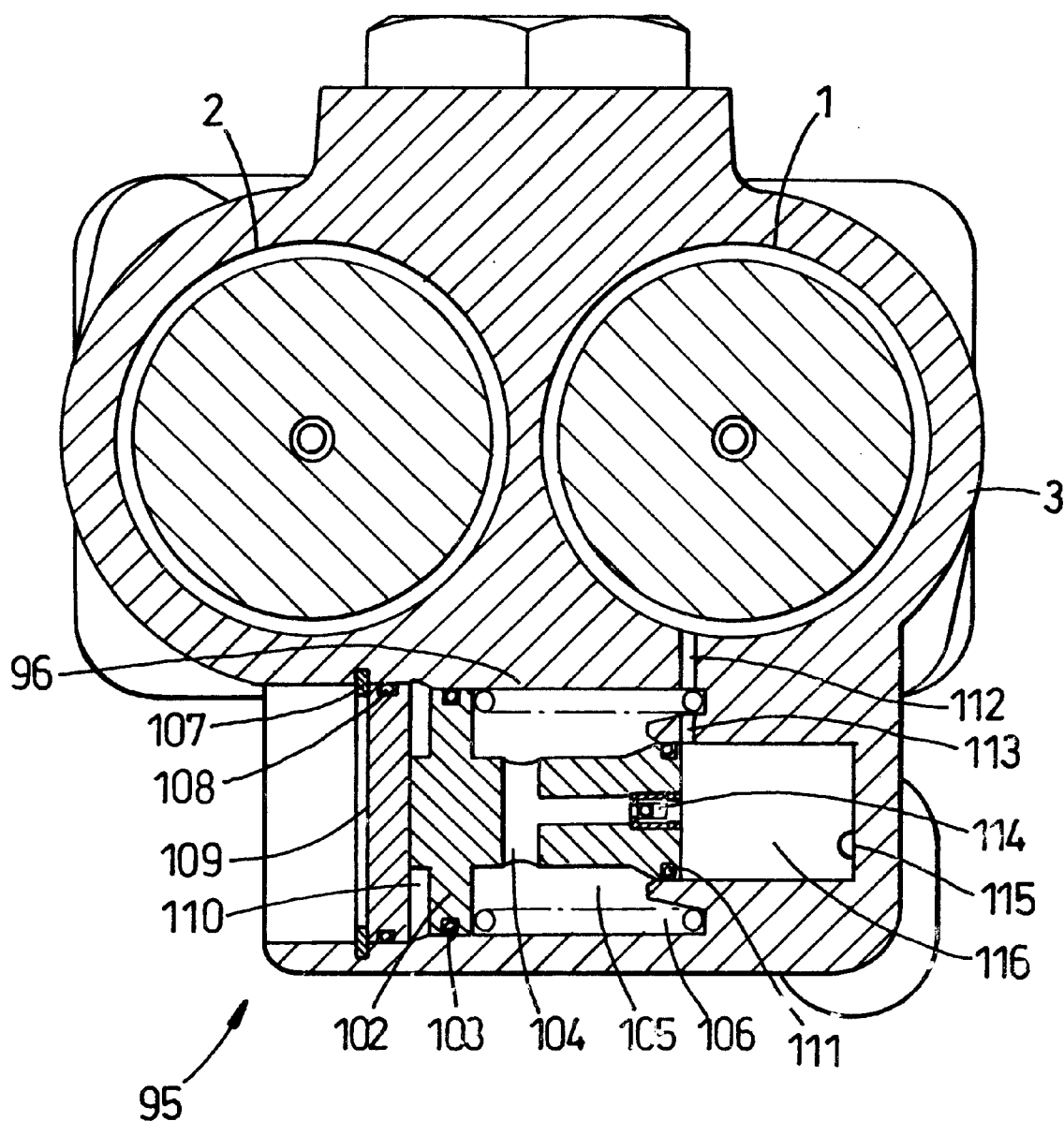
FIG. 4 is a section through the assembly substantially on the line 4—4 of FIG. 1.

Referring now to FIG. 4, the amplifier valve 95 is incorporated in the housing 1 for the combined booster and master cylinder assemblies and has a piston 102 slidable in a stepped bore 96. The bore 96 is closed at the wider end by a closure 109 retained by a circlip 107 and sealed by a static seal 108.

The rear end of the piston 102 is slidable in the wider end of the bore 96 and sealed by a seal 103. The front end of the piston 102 is slidable in the narrower end of the bore 96 and sealed by a seal 111.

The piston 102 is biased towards the closure 109 by a spring 106 and the outlet port 51 from the logic valve 50 opens into a chamber 110 between the closure 109 and the rear end of the piston 102. In this way, the pressure amplifier valve 95 is responsive to the pressure in the pressure chamber 81 of the logic valve 50.

A chamber 105 surrounds the piston 102 within the wider end of the bore 96 and communicates through a radial passageway 112 with a return to the reservoir.

A chamber 116 at the front end of the piston 96 within the narrower end of the bore 96 communicates with the front brakes/trailer brake valve through an exit port 115.

A one-way valve 114 is mounted at the front end of the piston 102 in an axial bore opening into the chamber 105 through radial ports 104. The one-way valve 114 s normally open in the retracted position to allow pressure equalisation between the chambers 105. 116.

The chamber 116 also communicates via a radial port 113 with the chamber 105 and through passageway 112 the return to the reservoir.

Operation of the dual combined hydraulic booster and master cylinder assembly will now be described with reference to FIGS. 1 to 4. First, operation of the assembly for braking a rear wheel on one side only of the vehicle for steering will be described followed by a description of the operation of the assembly for braking the front and rear wheels on both sides of the vehicle for full vehicle retardation.

In the rest or inoperative condition, the proportional pressure chambers 34 of both booster and master cylinder assemblies and the logic valve 50 are isolated from the high pressure fluid in the booster chambers 37 by the seals 26, 27, 22 and 23.

When the combined booster and master cylinder assembly in bore 2 is operated on its own, the spool 10a initially advances to cause the seal 27 to traverse the port 25. As a result, the reservoir and low pressure chamber 35 are isolated from the passageway 28 within the spool 10a and from the proportional pressure chamber 34.

Almost immediately, the seal 26 traverses the port 24 and allows pressurised oil from inlet 19 and boost chamber 37 into the proportional pressure chamber 34 and passageway 28. As a result, the combined boost piston 6 and master cylinder piston 14 are advanced in the bore 7. This causes the fluid in the pressure space 15 to pressurise, closing the recuperation valve 17 and applying the respective rear brake connected to the outlet 16 on one side of the vehicle to facilitate steering.

When pressure in the master cylinder is sufficient to provide a resistance to further movement of the piston 14, the spool 10a moves relatively in the rearward direction so that the seal 27 slightly opens the outlet ports 25 and the seal 26 slightly closes the inlet ports 24.

In this way, the booster controls the proportional pressure in the proportional pressure chamber 34 by feathering between the seal 27 and outlet ports 25 to allow pressure out whilst simultaneously feathering between the seal 26 and the inlet ports 24 to allow pressure in.

The proportional pressure required is a function of the required output and input force to the boost piston 6 and the plunger 10b respectively and the respective areas of piston 6 and plunger 10b determine the boost ratio.

As the piston 14 moves forward, the passage 83 communicates with the proportional pressure chamber 34 in bore 2 and the seal 23 traverses the passage 71 in bore 2.

The proportional pressure in passage 83 is isolated from the pressure chamber 81 of the logic valve 50 by the seals on opposite sides of the land 86 on the piston 54.

The passage 71 is connected to the boost chamber 37 and full boost pressure is admitted from the boost chamber 37 into the chamber 93 behind the piston 54 closing the one-way valve 91 and urging the piston 54 forward a distance X. The piston 56 remains stationary.

The passage 83 now connects with the opening 88 in the piston 54, but the proportional pressure is now isolated from the pressure chamber 81 of the logic valve 50 between the seals on opposite sides of the land 90 on the piston 56.

The reduction in volume of the pressure chamber 81 is accommodated by flow out through the one way valve 92 and back to the reservoir through the passage 72 and low pressure chamber 35 in the bore 1 of the other assembly.

In this way, the pressure chamber 81 is isolated from the high pressure fluid when the booster and master cylinder assembly in bore 2 is operated on its own and no flow occurs through the outlet port 51 to the pressure amplifier valve 95. As a result, only the rear brake associated with the booster and master cylinder in bore 2 is actuated and the front brakes and, where provided, trailer brake valve are not actuated.

When the pedal is released, the boost piston 6 and master cylinder piston 14 are returned to the retracted position by the spring 18 and the spool 10a returned to the retracted position by the spring 30. As a result, the boost chamber 37 is isolated from the proportional pressure chamber 34 and the proportional pressure escapes through the outlet ports 25 to the reservoir.

The recuperation valve 17 also opens relieving the boosted pressure in chamber 15. The boost chamber 37 is also isolated from the passage 71 which now communicates with the low pressure chamber 35 allowing the pressure in chamber 93 to escape to the reservoir. The one-way valve 91 opens and the pistons 54, 56 return to the rest or passive condition of the logic valve 50 under the biasing of the springs 60, 61.

When the combined booster and master cylinder assembly in bore 1 is operated on its own, the rear brake on the other side of the vehicle is operated by the pressure increase in chamber 15 when the piston 14 is advanced as described previously.

When the piston 14 advances, the passage 84 communicates with the proportional pressure chamber 34 in bore 1 and the seal 23 traverses the passage 72 in bore 1.

The proportional pressure in the passage 84 is isolated from the pressure chamber 81 of the logic valve 50 by the seals on the piston 54 on opposite sides of the land 85.

The passage 72 is connected to the boost chamber 37 admitting full boost pressure to the chamber 94 behind the piston 56 closing the one-way valve 92 and urging the piston 56 forward a distance Y. The piston 54 remains stationary.

The proportional pressure is still isolated from the pressure chamber 81 by the seals on opposite sides of the land 85 since the piston 54 has not moved.

The reduction in volume of the chamber 81 is accommodated by flow out through the one way valve 91 and back through the passage 71 to the reservoir via the low pressure chamber 35 in bore 2 of the other assembly.

In this way, the pressure chamber 81 is isolated from the high pressure fluid when the booster and master cylinder assembly in bore 1 is operated on its own and no flow occurs through the outlet port 51 to the pressure amplifier valve 95. As a result, only the rear brake associated with the booster and master cylinder in bore 1 is actuated and the front brakes and, where provided, trailer brake valve are not actuated.

When the pedal is released, the booster and master cylinder assembly in bore 1 returns to the rest position and the logic valve 50 returns to the rest position as described above for the other assembly.

As will now be appreciated, operation of each combined booster and master cylinder assembly on its own actuates the rear brake associated with the assembly on one side only of the vehicle to facilitate steering and the logic valve 50 operates to isolate the pressure amplifier valve 95 from the high pressure source. This corresponds to a first mode of operation.

When the combined booster and master cylinder assemblies in bores 1 and 2 are operated simultaneously, the spools 10 advance admitting pressure fluid to the proportional pressure chambers 34 to energise the boosters and operate the master cylinders as described above to actuate the rear brakes on both sides of the vehicle.

The positions of the passages 71, 72 in the bores 1, 2 are staggered so that, when the pistons 14 advance in the bores 1,2, the passage 72 is traversed by the associated seal 23 slightly before the passage 71 is traversed by the associated seal 23.

As a result, full boost pressure from the boost chamber 37 in bore 1 flows through the passage 72 and into the chamber 94 acting on the piston 56. This urges piston 56 through distance Y into the logic valve's "open" position for that piston. The fluid displaced by the piston 56 flows out through the one-way valve 91 since the passage 72 is traversed momentarily before the passage 71.

When the passage 71 is traversed by the seal 23, full boost pressure from the boost chamber 37 in bore 2 flows through the passage 71 into the chamber 93 and acts on the outer end of the piston 54 to urge the piston forward through distance X into the logic valve's "open" position for that piston.

This displaces a minimal volume of fluid to the pressure amplifier valve 95 since both one way valves 91 and 92 are now shut by the full boost pressures in chambers 93 and 94 at opposite ends of the bore 52. This volume, substantially 1 ml, is chosen such that it is too small to actuate the front brakes/trailer brakes.

The "open" position of both pistons 54 and 56 is controlled by the piston 54 having a larger area exposed to the pressure in chamber 93 than the area of piston 56 exposed to the pressure in chamber 94, and hence determining the overall position of the sub assembly comprising the pistons 54 and 56, since the pressures at opposite ends of the bore 55 are equal.

In the "open" position of both pistons 54 and 56, the passages 83 and 84 are connected to the ports 88 and 89 in the piston 54 which, in turn, are connected to the spaced ports 98 and 99 in the piston 56. Fluid now flows from the proportional pressure chambers 34 through the passages 83, 84 into the pressure chamber 81.

The proportional pressure is less than the boost pressure acting in chambers 93, 94 to close the one-way valves 91, 92 and fluid flows from the pressure chamber 81 through radial ports 79, 80 in the pistons 54, 56 and out of the outlet port 51 to the pressure amplifier valve 95 for actuating the front brakes on both sides of the vehicle and, where provided, the trailer brake valve.

The outlet port 51 communicates with the chamber 110 behind the piston 102 and the proportional pressure admitted to the chamber 110 urges the piston 102 forward.

As the piston 102 moves forward, fluid in the chamber 105 escapes to the reservoir via the passageway 112 as the volume of chamber 105 reduces. At the same time, the seal 111 traverses the port 113 causing the fluid in chamber 115 to pressurise closing the one-way valve 114 and actuating the front brakes and, where provided, trailer brake valve connected to the outlet port 115.

The proportional pressure in chamber 110 is amplified by the quotient of the area of chamber 110 to the area of chamber 116 and may be arranged to provide any desired amplification of the proportional pressure for actuating the front brakes and, where provided, trailer brake valve. For example an amplification factor of 3:1 may be employed.

In this way, the pressure is controlled by the proportional pressure generated by the combined booster and master cylinder assemblies which is directly controlled by the foot on the pedals.

When both pedals are released, both booster pistons 6 return to rest allowing the pressures in the chambers 93 and 94 at the opposite ends of the bore 52 to escape back to the reservoir through the passages 71 and 72.

As the pressure reduces in chambers 93, 94, pistons 54 and 56, themselves, are urged back to he passive position by forces in the springs 60 and 61 to isolate the passages 83, 84 and open the one-way valves 91, 92.

Fluid can now flow back from the chamber 110 of the amplifier valve 95 through the pressure chamber 81 of the logic valve 50 and back to the reservoir through the one way valves 91, 92 and the passages 71, 72.

As the pressure reduces in chamber 110, the piston 102 is urged back to the rest position by the spring 106 and the pressure in chamber 116. When the seal 111 traverses the port 113, the pressure in chamber 116 escapes and one-way valve opens 114 to equalise the pressures in chambers 105 and 116 in the rest condition.

The amplifier valve 95 is bled by fluid recuperated from the reservoir via passageway 112 into chamber 105 and through the bore 104 in the piston 102 and one-way valve 114 into the chamber 116. Chamber 110 does not require bleeding since the proportional pressure is an infinite supply provided by the vehicle.

In this way, operation of one of the assemblies on its own actuates the rear brakes associated with that assembly on one side of the vehicle for steering, and operation of both assemblies together actuates simultaneously the front brakes on both sides of the vehicle and/or the trailer brake valve together with the rear brakes on both sides of the vehicle for full vehicle retardation.

More particularly, the pressure to operate the rear brakes is provided conventionally through the booster and master cylinder of the associated assembly and the pressure to actuate the front brakes is enhanced by the amplifier valve incorporated into the housing for both assemblies together with the logic valve for controlling the activation of the amplifier valve according to the operation of the assemblies either separately or together.

The embodiment described above has the advantage that there is no requirement for separate auxiliary logic heads and amplifier valves. By providing a logic valve and amplifier valve common to both booster and master cylinder assemblies, the number of valve parts and associated pipework and fittings are reduced to a minimum. In this way, installation and maintenance is simplified with potential cost savings.

Figure 5:
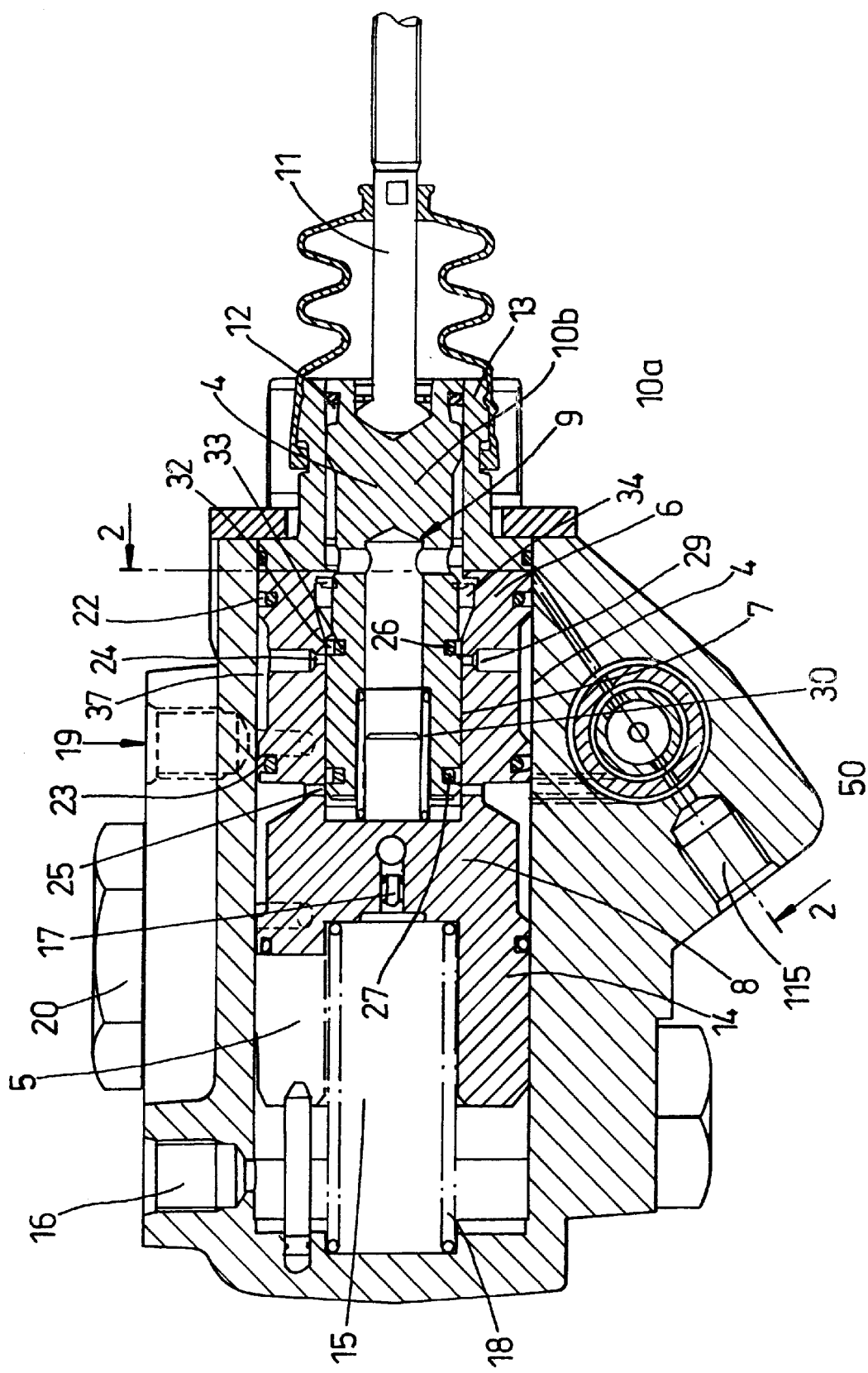
FIG. 5 is a longitudinal section through a second embodiment of a dual combined hydraulic booster and master cylinder assembly embodying the invention on the line 1—1 of FIG. 6.
Figure 6:
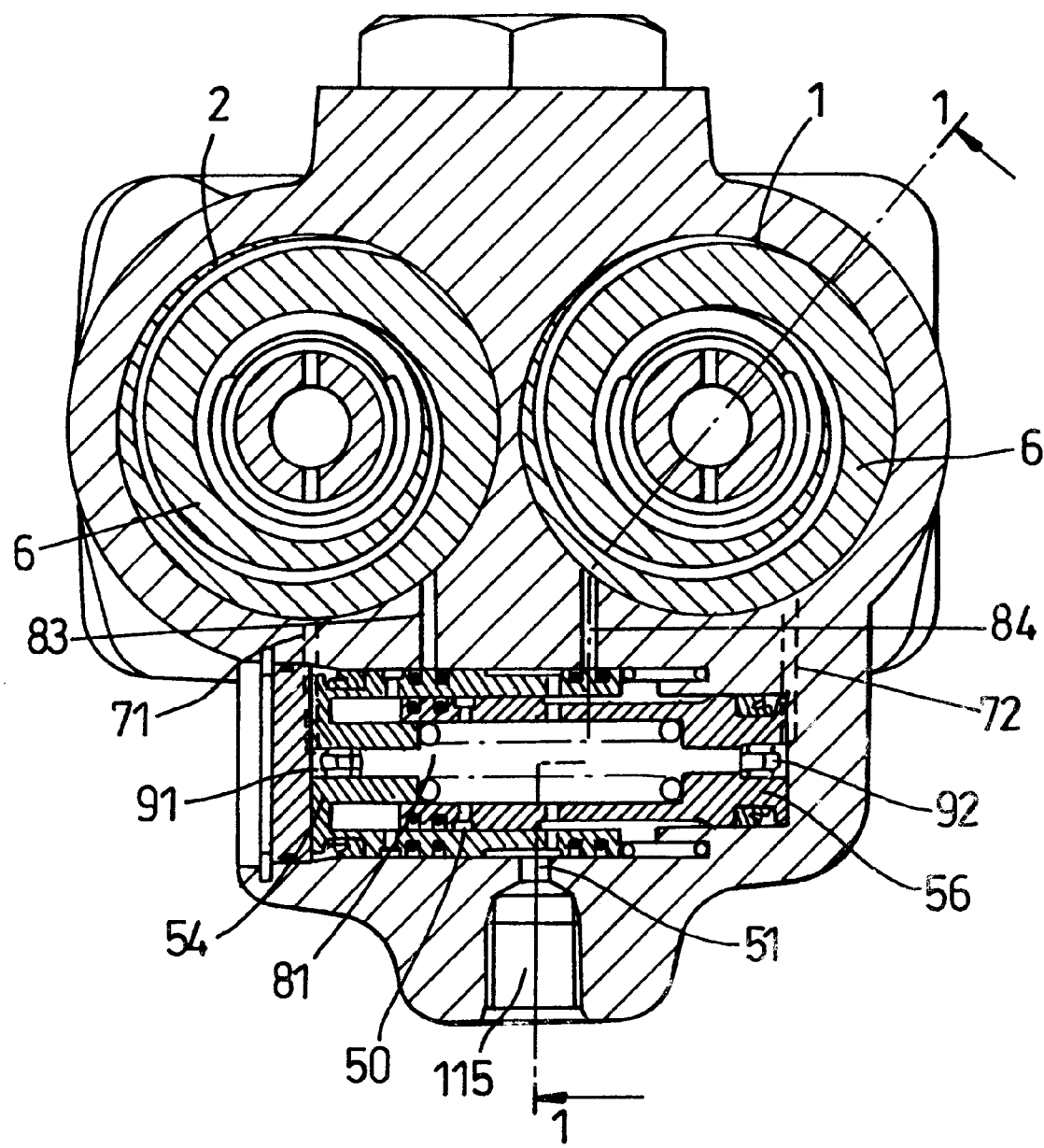
FIG. 6 is a section through the assembly substantially on the line 2—2 of FIG. 5.

Referring now to FIGS. 5 and 6, there is shown a second embodiment of a dual combined booster axis master cylinder assembly embodying the invention. As shown, the amplifier valve of the first embodiment is omitted from the housing. In other respects, the construction and operation of the second embodiment is similar to the first embodiment and will be understood from the previous description of the first embodiment.

For convenience and ease of understanding, like reference numerals are used in the drawings to indicate corresponding parts of both embodiments.

In this embodiment, the outlet port 51 from the logic valve 50 leads to the exit port 115 which may be in fluid communication with the braking system where the fluid pressure from the boosters is sufficient to actuate the braking system in the second mode of operation. Alternatively, the outlet port 115 may be in fluid communication with a separate pressure amplifier valve (not shown) for increasing the fluid pressure from the boosters for actuating the braking system in the second mode of operation.

Although the invention has been described with reference to preferred embodiments, it will be understood that the invention is not limited to the particular details of the construction and operation of the booster and master cylinder assemblies, the logic valve and the amplifier valve. Thus, various changes can be made to any of these without departing from the spirit and scope of the invention as defined in the claims.

I claim:

1. A dual hydraulic booster assembly for vehicle hydraulic braking systems comprising:
    a pair of pedal-operated hydraulic boosters adapted to be operated independently for applying a brake on a wheel on one side of a vehicle to facilitate steering in a first mode of operation and simultaneously for applying brakes on wheels on opposite sides of the vehicle for vehicle retardation in a second mode of operation, and a pressure amplifier for increasing the fluid pressure obtained in the second mode of operation when both boosters are operated simultaneously; and
    a logic valve responsive to booster pressures operable to isolate said pressure amplifier from said boosters when one booster is operated in the first mode of operation, and to place said pressure amplifier in fluid communication with said boosters when both boosters are operated simultaneously in the second mode of operation.

2. An assembly according to claim 1, wherein, in the first mode of operation, when one booster is operated, the supply of pressure fluid causes braking of one rear wheel on one side of the vehicle associated with that booster to facilitate steering and, in the second mode of operation, when both boosters are operated simultaneously, the supply of pressure fluid causes braking of the wheels on hot sides of the vehicle for normal service braking.

3. An assembly according to claim 1, wherein each booster comprises a boost piston working in a bore in a body adapted to generate an output force for operating an hydraulic master cylinder coupled to the rear brakes on one side of the vehicle in response to pressure in a boost chamber which is applied to a proportional power pressure chamber under the control of a control valve in turn responsive to an input force from a pedal.

4. An assembly according to claim 3, wherein each booster and associated master cylinder are combined and both booster and master cylinder assemblies are integrated in a common housing with the outputs from said master cylinders arranged to operate the rear brakes on opposite sides of the vehicle.

5. An assembly according to claim 3, wherein said logic valve comprises inner and outer pressure-responsive telescopic pistons working in a bore in said body and responsive to pressure applied to outer ends of said pistons by the associated booster to control the supply of pressure fluid in the first and second modes of operation.

6. An assembly according to claim 1, wherein said boosters, logic valve and said pressure amplifier form an integrated unit.

7. An assembly according to claim 1, wherein said amplifier comprises a piston working in a stepped bore to define chambers of different area for increasing the proportional pressure from said logic valve in a ratio according to the quotient of the areas.

8. A dual hydraulic booster assembly for a vehicle braking system comprising:
    a logic value responsive to booster pressures to control a supply of pressure fluid for braking on one side of a vehicle when one of said boosters is operated in a first mode of operation and for braking on both sides of said vehicle when both of said boosters are operated simultaneously in a second mode of operation, wherein each of said boosters include a boost piston working in a bore in a body adapted to generate an output force for operating an hydraulic master cylinder coupled to rear brakes on one side of the vehicle in response to pressure in a boost chamber which is applied to a proportional power pressure chamber under the control of a control valve, in turn responsive to an input force from a pedal, and said logic valve includes inner and outer pressure-responsive telescopic pistons working in a bore in said body and responsive to pressure applied to outer ends of said pistons by the associated booster to control the supply of pressure fluid in the first and second modes of operation; and
    wherein said pistons of said logic valve are held in a passive condition of said logic valve by a first spring acting between said pistons, and by a second spring acting on said outer piston only with respective preloads of said springs being chosen to withstand the collective threshold forces of seals on each piston to ensure full return of each piston to the passive condition upon release of the pressure applied to said outer end.

9. An assembly according to claim 8, wherein said logic valve is provided with oppositely acting one-way return valves which are normally open in the passive condition, and are closed to prevent fluid flowing from said pressure chamber back to said boosters when said pressure chamber is pressurised and which open again to return fluid to a reservoir upon release of the boost pressure at the end of the braking cycle.

10. An assembly according to claim 9, wherein said pistons are displaced by the full boost pressure from the associated booster which acts to close said one-way valves and, when both boosters are operated together, said pressure chamber is connected to the proportional pressure in said proportional power pressure chambers of both boosters which never exceeds the full boost pressure to ensure said one-way valves remain closed.

11. An assembly according to claim 10, wherein, at the knee-point of said booster assembly, when the proportional pressure equals the full boost pressure, said logic valve is held in equilibrium and said springs urge said pistons into the passive position, but with full boost pressure applied through said pressure chamber.

12. A dual hydraulic booster assembly for a vehicle braking system comprising:
    a logic value responsive to booster pressures to control a supply of pressure fluid for braking on one side of a vehicle when one of said boosters is operated in a first mode of operation and for braking on both sides of said vehicle when both of said boosters are operated simultaneously in a second mode of operation, wherein each of said boosters includes a boost piston working in a bore in a body adapted to generate an output force for operating an hydraulic master cylinder coupled to rear brakes on one side of the vehicle in response to pressure in a boost chamber which is applied to a proportional power pressure chamber under the control of a control valve, in turn responsive to an input force from a pedal, and said logic valve includes inner and outer pressure-responsive telescopic pistons working in a bore in said body and responsive to pressure applied to outer ends of said pistons by the associated booster to control the supply of pressure fluid in the first and second modes of operation, and wherein in the second mode of operation, displacement of both pistons relative to each other when both boosters are actuated allows flow through passages leading from said boosters to a pressure chamber defined between said pistons for braking on both sides of a vehicle.

13. An assembly according to claim 12, wherein said passages are isolated from said pressure chamber in both the passive condition and when either booster is operated alone.

14. A dual hydraulic booster assembly for a vehicle hydraulic braking system of the kind comprising a pair of pedal-operated hydraulic boosters which are adapted to be operated simultaneously for applying brakes on wheels on opposite sides of a vehicle for vehicle retardation and independently for applying a brake on a wheel on one side of the vehicle to facilitate steering, in which each booster comprises a boost piston working in a bore in a body adapted to generate an output force for operating an hydraulic master cylinder in response to pressure in a boost chamber which is applied to a proportional power pressure chamber under the control of a control valve, in turn responsive to an input force from the pedal, and a logic valve responsive to booster pressures to control the supply of pressure fluid to a common outlet port, the logic valve being movable between a rest position, to isolate the outlet port from both boosters when one booster is operated, and an open position in which pressure fluid is supplied to the outlet port when both boosters are operated simultaneously.

15. A dual hydraulic booster assembly for a vehicle braking system comprising:
   a logic value responsive to booster pressures to control a supply of pressure fluid for braking on one side of a vehicle when one of said boosters is operated in a first mode of operation, and for braking on both sides of said vehicle when both of said boosters are operated simultaneously in a second mode of operation; and
   a pressure amplifier to increase the pressure of the pressure fluid supplied by said logic valve when both boosters are operated simultaneously including a piston working in a stepped bore to define chambers of different areas for increasing the proportional pressure from said logic valve in a ratio according to the quotient of the areas, and said piston is responsive to the proportional pressure from said logic valve to displace said piston against a return force and pressurize fluid in an outlet chamber connected to a braking system for the front brakes and the trailer brakes, and said outlet chamber is connected to a reservoir to relieve the pressure in said outlet chamber when the brakes are released.

* * * * *